Sept. 1, 1964 R. D. SCOTT 3,147,460

ERROR DETECTION SYSTEM UTILIZING A PARITY CHARACTER

Filed Dec. 26, 1961 5 Sheets-Sheet 1

INVENTOR
RICHARD D. SCOTT

BY J J Hamill

ATTORNEY

ERROR DETECTION SYSTEM UTILIZING A PARITY CHARACTER

Filed Dec. 26, 1961 5 Sheets-Sheet 2

INVENTOR
RICHARD D. SCOTT
BY J. J. Hamill
ATTORNEY

ERROR DETECTION SYSTEM UTILIZING A PARITY CHARACTER

Filed Dec. 26, 1961 5 Sheets-Sheet 3

INVENTOR
RICHARD D. SCOTT
BY J.J. Hamill
ATTORNEY

INVENTOR
RICHARD D. SCOTT
BY [signature]
ATTORNEY

Sept. 1, 1964 R. D. SCOTT 3,147,460
ERROR DETECTION SYSTEM UTILIZING A PARITY CHARACTER
Filed Dec. 26, 1961
5 Sheets-Sheet 5

INVENTOR
RICHARD D. SCOTT
BY JJ Hamill
ATTORNEY

United States Patent Office 3,147,460

Patented Sept. 1, 1964

3,147,460

ERROR DETECTION SYSTEM UTILIZING A PARITY CHARACTER

Richard D. Scott, Chicago, Ill., assignor to Teletype Corporation, Skokie, Ill., a corporation of Delaware Filed Dec. 26, 1961, Ser. No. 161,848
13 Claims. (Cl. 340—146.1)

The invention relates to an error detection system for telegraph messages and more particularly to an error detection system wherein binary counts are made at both transmitting and receiving stations, of the signal pulses of one or another of two conditions of a plurality of code combinations or characters.

While the choice of the number of code combinations over which a check is to be performed is an arbitrary one, a line of characters has been chosen as a logical unit or block of characters over which a parity check or count of pulses may be conducted since the boundaries of a line of characters are readily identifiable by the carriage return, line feed and letters characters transmitted at the end of each line. Furthermore, the number of characters in a line (normally seventy-two) is sufficient to limit the number of parity check codes to be transmitted to a small enough amount to avoid excessive redundancy. The present invention is concerned with the binary counting of the pulses of one condition being transmitted and received at each level of a telegraphic code and in the utilizing of the binary counters not only for the counting of the pulses of one condition but also for the recognition of the characters designating the end of a line.

Accordingly, an object of the invention is to count the pulses of one of two conditions and to use the counters making this count to recognize predetermined characters.

Another object of the invention is to binarily count the pulses of one of the conditions in each level of a telegraphic code separately and to use the sequence of operation of the binary counters making these counts to complete a character recognition circuit.

Another object of the invention is to binarily count the pulses of one condition in each level separately, the binary counters shifting back and forth between two unique stable states and passing through transition states to reach the stable states whereby the permutative combination of counters in stable states and transition states is used to identify the character being counted.

Another object of the invention is to binarily count the telegraphic pulses of one condition being transmitted from a transmitting station and being received at a receiving station and to use the operating sequences of the counters performing the binary counts at each station to identify predetermined signals and thereby initiate transmission of the state of the binary counters at the transmitting station and initiate comparison at the receiving station of the transmitted states of the binary counters with the receiving station's binary counters.

Another object of the invention is to prepare a message tape in which the parity check character derived from the states of the binary counters is deleted from the message tape by the letters characters appearing in the sequence of characters, "carriage return, line feed, and letters," which sequence constitutes the boundaries of a line of characters over which the parity check is being performed.

In the preferred embodiment of the invention there is provided an error detection system wherein a tape reader generates marking and spacing pulses which are monitored by a binary counter associated with each level of the code combinations or characters being transmitted to perform a binary count of the marking pulses in each level. The binary counters operate in a predetermined sequence and when the pulses of a predetermined one of the characters of the end of a line sequence of characters is being counted in the binary counters, the operating sequence of the counters at this time conditions circuitry to suspend tape feeding and sensing operations at the tape reader and to initiate the transmission of the result of the binary count as a parity check character. The message characters and the check character are transmitted to a receiving station wherein a reperforator punches the message in a tape and binary counters perform a counting operation of the marking pulses received in each level. The binary counters at the receiving station condition a check character comparison circuit upon receipt of an end of a line character and suspend tape feeding and punching operations during comparison of the remotely and locally generated check characters. A lack of agreement between check characters causes an alarm and shutdown of the equipment.

Other features and advantages of the invention will become apparent from the following detailed description when considered in conjunction with the accompanying drawings wherein.

Figure 7:
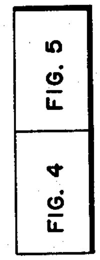
Figure 6:
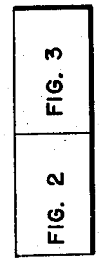
Figure 4:
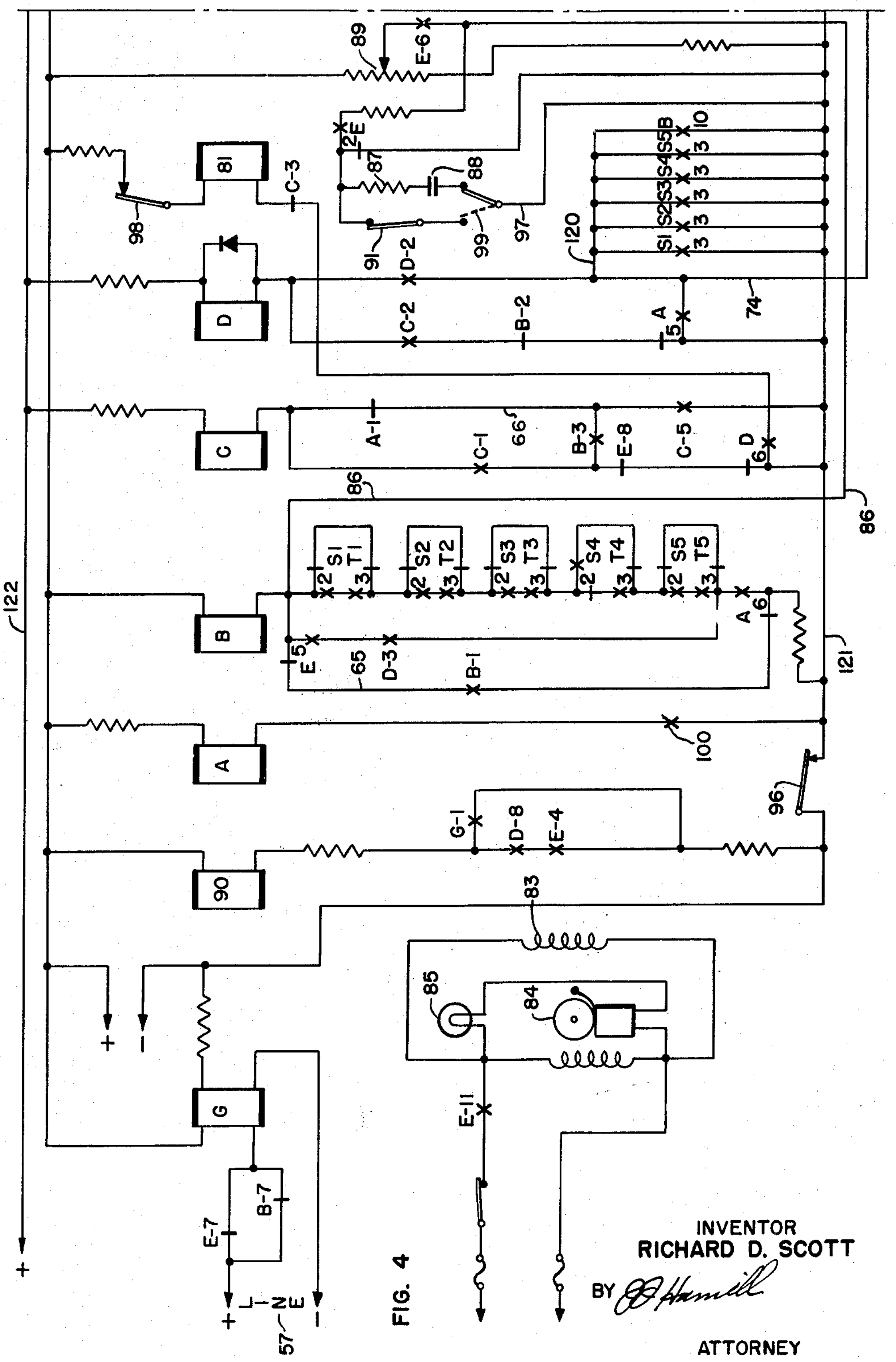
Figure 5:
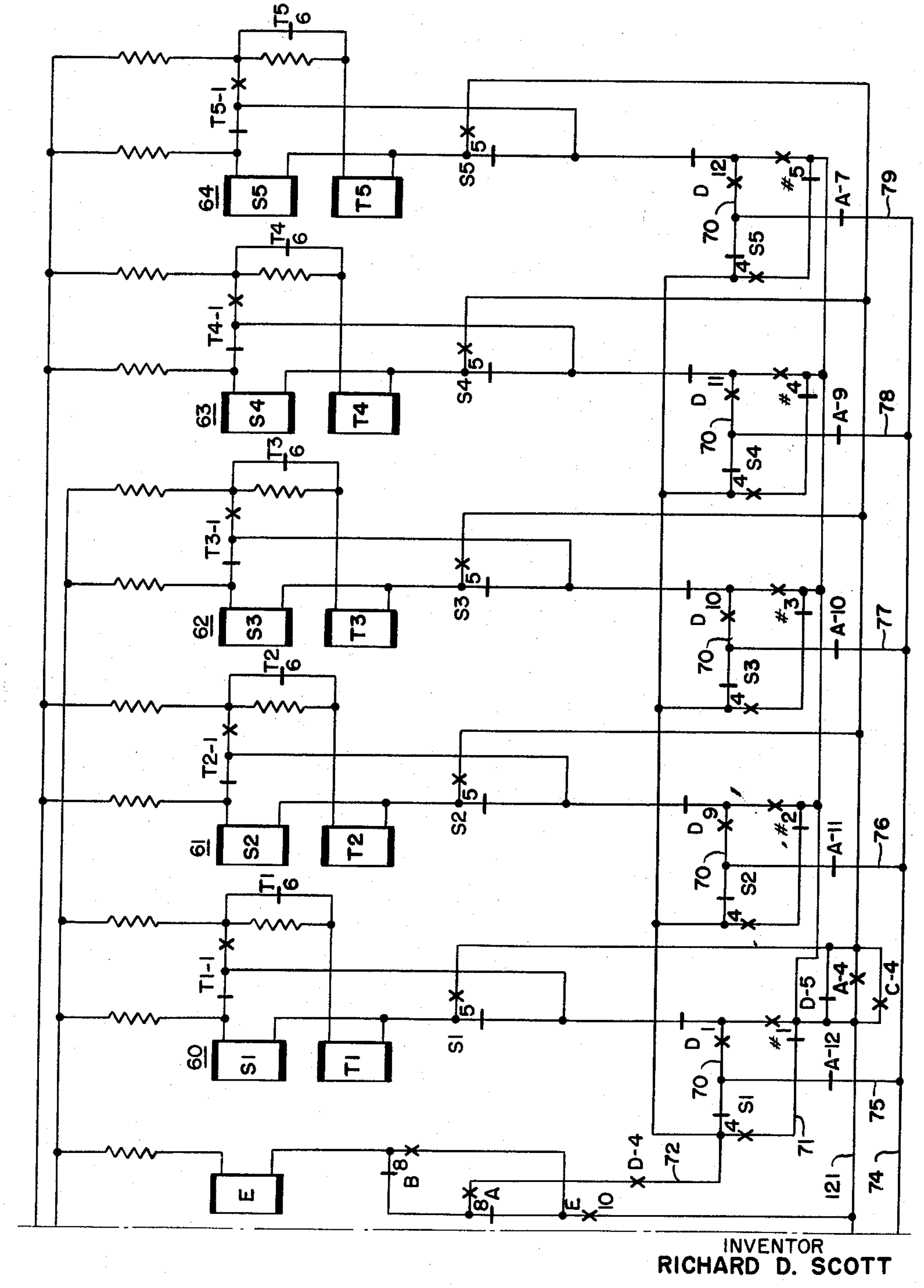

FIGS. 4 and 5 are detached contact schematic drawings of the error detection circuitry for the reperforators; and FIGS. 6 and 7 are block diagrams showing the relationship of FIGS. 2 and 3 and FIGS. 4 and 5 to one another.

Figure 1:
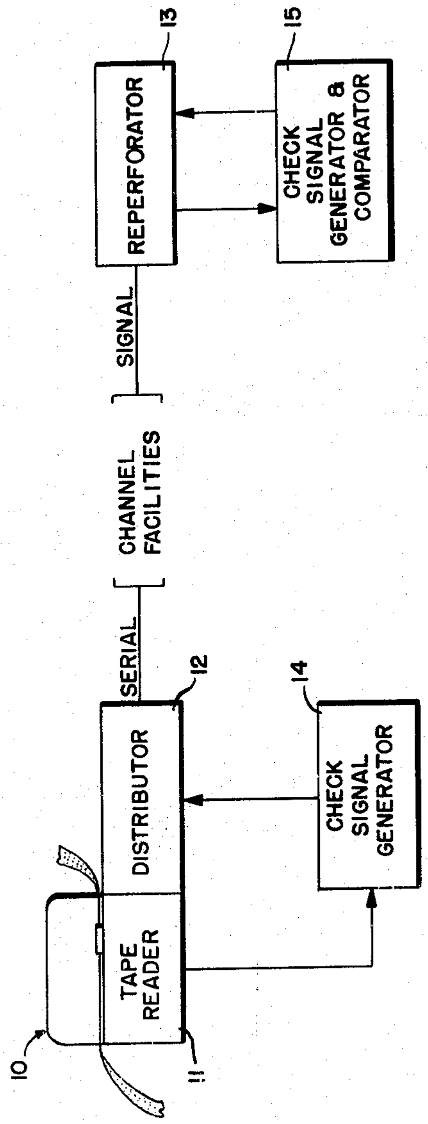
FIG. 1 is a block diagram illustrating schematically a reader and reperforator with the attached error detection accessories arranged according to the present invention.

Referring to FIG. 1 in the drawing, there is disclosed a block diagram of the conventional tape-to-tape teletypewriter transmission system to which error detection facilities have been added. A tape reader 10 senses each column of a perforated tape and generates a signal representative of one of two conditions, normally either a marking or spacing condition, for each perforation or lack thereof in each level of the tape. The tape reader transmitter 10 is a commercially available two-shaft transmitter distributor type of device like that shown in United States Patent No. 2,348,214, issued May 9, 1944, to Erwin A. Gubisch, wherein a separate clutch and shaft is provided for operating reading sensing pins and a separate clutch and sequential cam shaft is provided for sequentially distributing as marking and spacing pulses the information read by the sensing pins. In a two-shaft transmitter distributor a character is read by the sensing pins approximately one character cycle before it is distributed by the sequential cam shaft. The marking and spacing pulses are transmitted as serial signals over telegraphic transmission facilities to a typing reperforator 13 which records the signals in the form of punched tape. The typing reperforator preferably is that shown in the patent to R. E. Arko et al., Patent No. 2,951,902, issued September 6, 1960. The tape reader 11 has a first set of contacts each operable by a sensing pin for applying the marking and spacing pulses to the distributor 12.

Associated with the conventional teletypewriter system described above is a check signal generator 14 which monitors a second set of contacts associated with the sensing pins of tape reader 11 and counts the parallel pulses representative of marking and spacing conditions in each level of each character in the message. Each of the parallel signals from the tape reader 11 is counted by a two-relay flip-flop associated with its level, i.e., the flip-flop making an odd-even summation of the marking pulses in its associated level. Thus, after successive characters have been transmitted, the odd-even count in a level indicates whether the total number of marking pulses having been transmitted over that particular level is an odd or even number of marking pulses. Similarly, at the receiving station a check signal generator and comparator 15 makes an odd-even summation of the marking pulses in each level of the received characters.

Both the check signal generator 14 at the transmitting station and the check signal generator and comparator 15 at the receiving station have a series-parallel circuitry completed by the operating sequences of the two-relay flip-flops during the monitoring of a carriage return signal for recognizing a carriage return signal. At the transmitting station, the recognition of the carriage return signal initiates the stopping of the sensing of the tape by the tape reader 11 and the transferal of a check character from the check signal generator 14 to the distributor 12 for serialized transmission over the telegraph channel facilities to the reperforator 13 where the transmitted check character is converted from serialized to parallel form and sent to the check signal generator and comparator 15 for comparison with the check character generated at the receiving station. Agreement of the check characters is an indication that no error has occurred during the transmission of the traffic characters in the block, whereas a lack of agreement between check characters is an indication that an error has occurred during transmission. An alarm shutdown is used to indicate the occurrence of an error within the previously transmitted block of characters.

Referring now to FIGS. 2–5, there are shown schematic diagrams of the check signal generator 14 and check signal generator and comparator 15 according to this invention. In these drawings the relay contacts are shown in the form known as detached contact schematic diagrams whereas the other contacts are shown in the conventional manner. The detached schematic diagram is believed to be a well-known type of graphical representation which greatly simplifies the presentation of relay circuitry on which a large number of contacts are shown. All contacts are shown in their functional positions rather than in relation to their associated operating coils and are identified with designations corresponding to their operating coils. Make contacts, normally open, are represented by crosses and break contacts, normally closed, are represented by a single line perpendicular to the lead line in which the contacts lie.

The error control facilities are made operative by pivoting an error control switch 93 (FIG. 2) at the transmitting station clockwise to engage the contact 95 to connect the negative side of a current source 110 to a lower conductor 111 common to the relay coils of five parity counters 20 to 24, inclusive, which relay coils are connected through suitable resistors (to be described more in detail hereinafter) to an upper common conductor 112 connected to the positive side of said source. During normal error-free operation of the system, slow release relay E (FIG. 2) is continuously energized holding its make contacts E–3, E–6, and E–7 closed. The operation of the portion of the circuit for controlling relay E will be described hereinafter.

Referring again to FIGS. 2 and 3 there are illustrated five parity counters 20–24, inclusive, each having a "T" relay and an "S" relay, designated T1, S1; T2, S2; T3, S3; T4, S4; T5, S5; respectively, that function as flip-flops and which are commonly known as W–Z or pulse frequency dividers. That is, the parity counters 20–24 will flip or flop individually each time a ground pulse is applied from an associated code reading contact of the group of contacts shown as make contacts Nos. 1, 2, 3, 4 and 5.

Each of the code reading contacts Nos. 1, 2, 3, 4 and 5 is closed upon the sensing of a perforation in its associated level and remains closed until a spacing condition is sensed in a subsequent character. Accordingly, to distinguish between successive perforations, it is necessary to probe the contacts once each reader cycle. A clock pulse relay A is energized once in each reading cycle upon the closure of a universal contact 48 by a cam (not shown) on the distributor shaft in the reader transmitter 10. Upon energization, relay A closes its make contacts A–1, A–2, A–3, A–7 and A–5 in the energizing paths for the parity counters 20–24 thereby furnishing the timing pulses for these parity counters 20–24 and causing energization of those parity counters having their respective code reading contacts closed at that time.

The operation of the parity counters 20–24 consists of four sequential conditions or states which are repeated as the parity counters recycle. Two of the states are stable states, viz., a 1 or odd count state which is present after receipt of the first marking pulse and all subsequent odd numbered marking pulses and in which both the S and T relays are energized, and a 0 or even count state which is present after the receipt of the second marking pulse and all subsequent even numbered pulses and in which both the S and T relays are de-energized. The other two states are the transition states, i.e., changing from an odd to even state or even to odd state, in which only one of the S and T relays will be operated. Whether the S or T relay is operated depends upon which one of the previous stable states was present prior to the receipt of an initiating pulse for the transition states. During the transition from a 0 even count state to 1 odd count state the S relay is operated whereas the T relay is not operated until termination of the transition state; and during a transition state from a 1 odd count state to a 0 even count state the T relay will be operated whereas the S relay will not be operated. Termination of a transition state finds both of the S and T relays either energized or de-energized, whereas during a transition state only one of the S or T relays is energized.

For example, the first marking pulse received in the parity counter 20 will result in make contact No. 1 being closed and upon the closing of the contact A–1 by clock pulse relay A, a circuit will be completed from conductor 111 through make contacts No. 1 and A–1, break contact S1–5, now closed, and the coil of the S1 relay and a break contact T1–11, now closed, and a resistor 113 to the positive conductor 112 to energize relay S1. The energizing of an S relay constitutes a first transition state. The S1 relay then locks up through its make contact S1–5 in the path from negative battery conductor 111, the coil of the S1 relay and through resistors 26 and 113 to positive battery conductor 112. The T1 relay does not operate while the contact A–1 opens because of the following shunt path: make contact No. 1, now closed, make contact A–1, now closed, lead 16, break contact T1–9, now closed, lead 17, and resistor 114. When the connection to the current source is broken by the opening of make contact A–1, this shunt path is broken and the T1 relay then operates through a circuit from conductor 111, make contact S1–5, now closed, lead 18, coil of relay T1, lead 17, and resistor 114 to the conductor 112. Thus, both the S1 and T1 relays are operated which indicates that summation of marking pulses in the first level is odd, this constituting the 1 stable state.

Upon detection of the presence of the next marking pulse by the No. 1 contact and the closure of the make contact A–1, a shunt for the S1 relay will be completed through lead 16 and the make contact T1–9, now closed, thus, causing the S1 relay to release. The shunt release of relay S1 is normally a slow operation; and to speed the shunt release, the resistance 26 is placed in the circuit of the S1 relay by the now opened contact T1–11 to accelerate decay of the current when a shunt is placed across the coil of relay S1. After release of relay S1, the previously traced operating path for T relay is opened by make contact S1–5, but relay T1 is locked operated by a path extending from negative battery 111, make contact No. 1, now closed, make contact A–1, now closed, break contact S1–5, now closed, and coil of the T1 relay to conductor 112. Thus, relay S1 is de-energized and relay T1 is energized and the counter 20 is in the second transition state. Upon the opening of contact A–1 at the end of the clock ulse, the path to the T1 relay through make contact A–1 is broken and the T1 relay is released to join the released S1 relay in the stable, even count 0 state. Thus, it will be seen that S1 and T1 relays perform as a bistable device or flip-flop, staying in one state until receipt of a marking pulse which causes change from one stable state to another stable state. Inasmuch as each of the parity counters 20–24 respond in a similar manner to the reception of a marking pulse in its level, it is considered that the operation of the other parity counters will be understood from the discussion of the first parity counter 20.

The parity counting of the marking pulses in each of the parity counters 20–24 continues for one line of characters, a line of characters being designated a block of characters or a message. Since a line may have varying numbers of characters therein, a line of characters is defined as a variable block of characters. To initiate transmission of the odd-even summations of the marking pulses in each of the parity counters 20–24 at the end of a line of characters, a block boundary recognition circuit is provided. It is usual in telegraph transmission to have each line bounded by a carriage return signal, and a line feed signal, and one of these signals or both of them could be used to designate the boundary of a line as could any other signal chosen for such use. In this embodiment of the invention, the carriage return signal is used to designate the end of the variable block.

Figure 2:
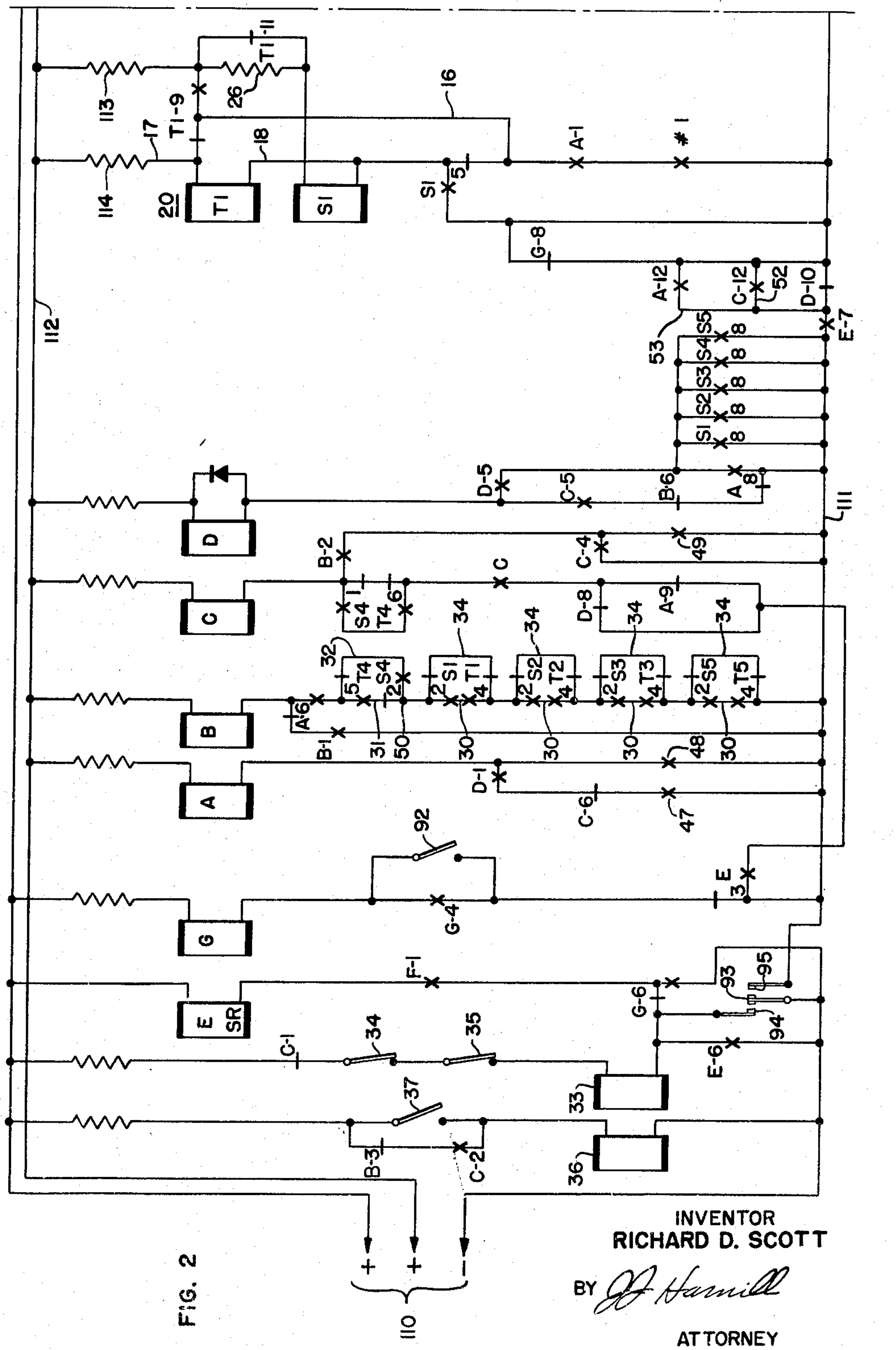
FIGS. 2 and 3 are detached contact schematic drawings of the error detection circuitry for tape reader transmitter.
Figure 3:
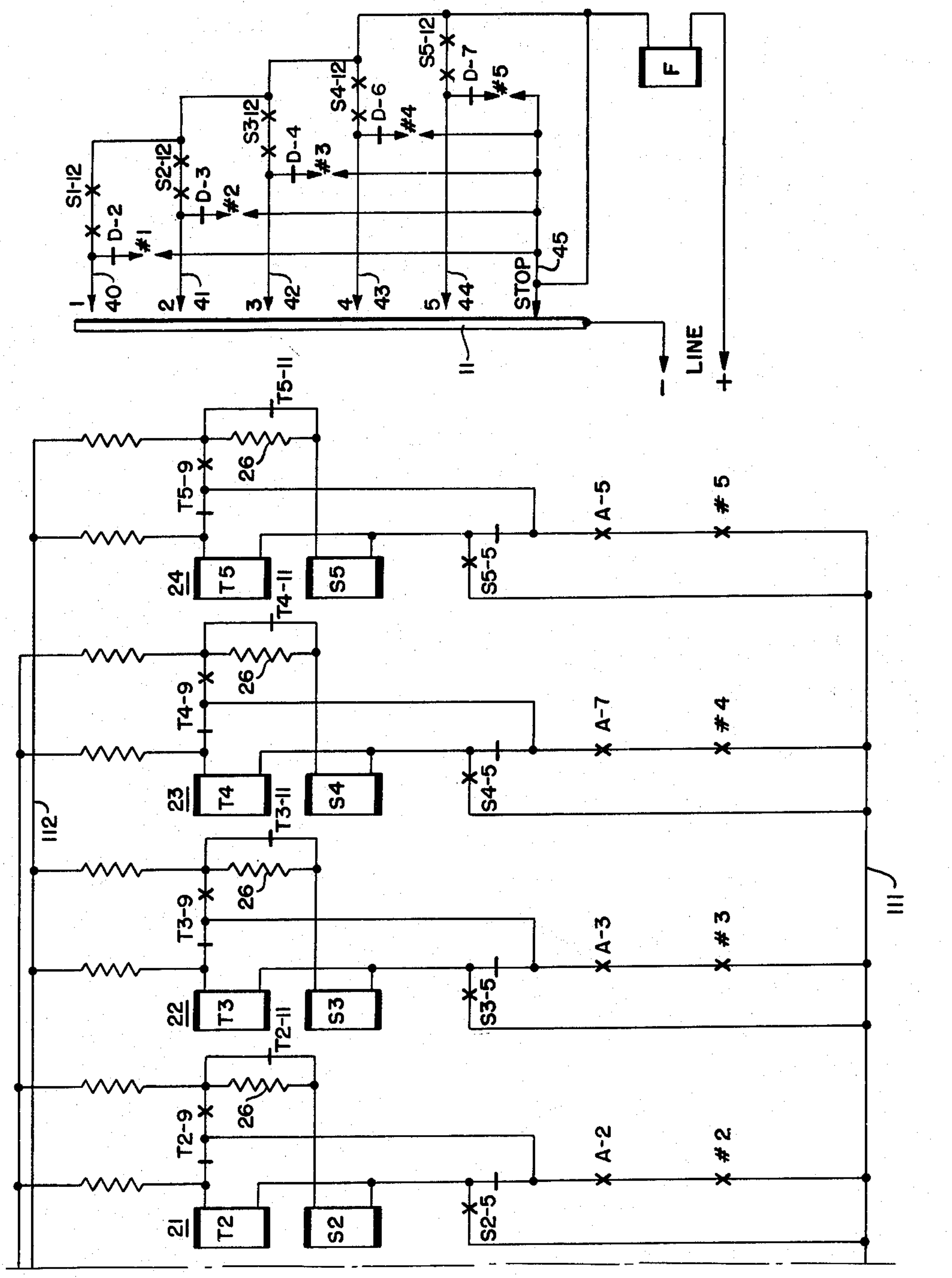

The recognition circuit for the carriage return signal, for energizing a carriage return storing relay B, includes the make and break contacts of all the S and T relays which contacts are permutatively arranged as shown in FIG. 2 according to their stable or transition states. It will be remembered that parity counters 20–24 have two stable and two unstable states and that those parity counters receiving a marking pulse will be undergoing a transition and those not receiving a marking pulse remain in their stable state. The carriage return character has only a single mark and that is in the fourth level. The carriage return recognition circuit is completed when four of the parity counters 20, 21, 22 and 24 are in a stable state and the other parity counter 23 in the fourth level is in a transition state. More particularly, in the parity counter 23 the relays S and T are in one of two unique conditions when shifting state and it is possible to combine contacts of S and T relays so that a circuit will be completed only during the time that a marking pulse is applied to these relays in the parity counter 23. Thus, it is possible to recognize whether a level is receiving a mark or not by determining if the counter associated with that level is going through a transition state. For example, in the operating circuit of the B relay, the T4–5 contacts of the T4 relay and the S4–2 contacts of the S4 relay, are so arranged that a circuit will be completed to energize carriage return storing relay B over lead 32 when the S4 relay is energized and the T4 relay is de-energized as in a 0 to 1 transition or shift state, there being only one relay energized during the shifting state. Similarly, when shifting from 1 to a 0 state, the T4 relay is energized and the S4 relay is deenergized causing a circuit to be completed over lead 31 through the now closed break contact S4–2 and the now closed make contact T4–5. Thus, a marking pulse applied to the fourth parity counter 23 will cause completion of the circuit irrespective of whether or not the counter was in its 1 or 0 state. This may be termed a transition state recognition circuit.

To recognize the presence of a space condition at the other four parity counters 20, 21, 22 and 24, stable state recognition circuits are connected in series with the transition state recognition circuit of counter 23 in the operating circuit of the B relay. Remembering that both of the relays S and T are either energized or de-energized during a stable state, it is apparent that if both the S and T relays of the counters 20, 21, 22 and 24 are energized, the make contacts S1–2 and T1–4, S2–2 and T2–4, S3–2 and T3–4 and S5–2 and T5–4, associated therewith are closed and a path is completed from conductor 111 through these now closed make contacts to junction 50 in lead 30 leading to the B relay. If both the S and T relays of the counters 20, 21, 22 and 24 are de-energized, the break contacts S1–2 and T1–4, S2–2 and T2–4, S3–2 and T3–4 and S5–2 and T5–4 are closed and a path is completed over lead 34 from conductor 111 through these break contacts, now closed, to the junction 50. Thus, the energizing circuit for relay B is completed only during the presence of spacing pulses in the first, second, third and fifth levels since the presence of a marking pulse in any one of these levels would cause its associated S relay to be in a state differing from that of the T relay. Accordingly, the make and break contacts of the S and T would assume opposite states and both of the paths 30 and 34 would be open. Similarly, if a spacing pulse were present in the fourth level, neither of the paths 31 or 32 would be completed as the make and break contacts of relay S4 and T4 would be in the same state. The energizing circuit for relay B through these paths also includes make contact A–6, which requires that the energizing circuit be completed during the clock pulse from clock pulse relay A. Also, because a transition state occurs only during a clock pulse from relay A, the carriage return recognition circuit is completed only during the receipt of a marking element. Relay B locks up over a path from negative battery conductor 111 make contacts B–1, now closed, break contacts A–6, now closed, and the coil of relay B to positive battery conductor 112.

During the message, the S4 and T4 relays are shifting state in the parity counter 23 at the beginning and end of the clock pulses and there is a chance that transient currents might operate relay B as though a carriage return character had been recognized. To avoid this, make contact A–6 is included in the energizing and locking paths for relay B. Upon the termination of the clock pulse, make contact A–6 opens very quickly relative to the changing of state of any of the T relays thereby preventing the operation of relay B by transient currents, if any, available at the end of the clock pulse. If a transient current is present at the very beginning of the clock pulse, relay B might be temporarily energized, but relay B will not remain energized throughout the duration of the clock pulse unless a true carriage return code combination is present. Because of the short duration of the transient current, relay B will not remain energized until break contact A–6 closes at the end of the clock pulse. Hence, even if relay B becomes temporarily energized and make contact B–1 temporarily closes, make contact B–1 will reopen before break contact A–6 could complete a locking path for relay B.

Relay B stores the recognition of the carriage return signal by remaining energized for one character cycle, at the end of which, relay B is de-energized by the opening of the break contact A–6 by relay A. The opening of the break contact A–6 occurs during the sensing of the line feed character.

The sensing of characters by the tape reader 11 must be suppressed during the transmission of the check character and it is the function of the feed deletion relay C to stop the tape feeding and tape sensing by the tape reader 11 during this check character transmission. The feed deletion relay C has its break contact C-1 in the circuit of a reader clutch magnet 33 and this break contact opens the circuit of the reader clutch magnet 33 upon the operation of relay C thereby stopping the tape sensing operation. It will be remembered that the tape reader transmitter 10 is a two-shaft transmitter distributor type of reader wherein a character in the tape is read approximately one character cycle earlier than the character being distributed. Therefore, the recognition of the carriage return character and the ensuing operation of relay C with the opening of break contact C–1 de-energizes clutch magnet 33 to disrupt the sensing and feeding of the tape after the reader 11 has sensed the line feed character but prior to the sensing of the letters characters. Thus, the tape sensing is halted prior to the sensing of the letters character which is the character following the line feed character.

To assure that relay C initiates the sending of the check character only after both the carriage return and line feed characters have been read by the reader 11 and conversely does not interrupt the operation of the reader 11 between the carriage return and line feed signals, an auxiliary contact 49, closable by a cam (not shown) on the reader shaft during the reading operation of a character, is included in the energizing path for relay C. The auxiliary contact 49 is included in the energization path of relay C to keep the path open and relay C from operating until the line feed character is being read. If there is an interruption of the reading cycles between carriage return and line feed by tape-out contact 34 or by on-off contact 35, the energization of the C relay is inhibited since contact 49 is open during such a condition. As a result, transmission of a check character is not initiated. The initial operate circuit for relay C is through the make contacts B–2 and the transmitter auxiliary contact 49. In order to avoid de-energization of relay C due to the transmitter auxiliary contact 49 opening before the S4 and T4 relays have reached a stable state to complete another locking circuit for the C relay, a make contact C–4 is provided to afford an alternate holding circuit with the now closed make contact B–2 to hold the C relay energized until the S4 and T4 relays reach their stable states. The normal holding path for the C relay is either through the break contacts S4–1 and the break contacts T4–6 when the S4 and T4 relays are released or through the make contacts S4–1 and T4–6 when the S4 and T4 relays are energized.

A cam (not shown) on the reader shaft of the reader 10 permits a clutch trip contact 37 to open in the energizing path of the distributor clutch magnet 36 when the reader 10 is stopped. However, the distributor clutch magnet 36 remains energized to transmit the check character by a parallel circuit completed through break contact B–3 and make contact C–2. Thus, the distributor 12 transmits the check character even though the tape reader 10 has shutdown.

The relay D initiates the check character transmission by switching the distributor input leads 40–44 (right side of FIG. 3) from the tape reading contacts Nos. 1–5 to the contacts S1–12 to S5–12 of the partity register 20–24. The energizing path for the relay D is completed from conductor 111, break contact A–8, break contact B–6, and make contact C–5 through coil of relay D to conductor 112. Upon the energization of relay D, its make contacts D–2, D–3, D–4, D–6 and D–7 close the circuit to parity counters 20–24 and its break contacts D–2, D–3, D–4, D–6 and D–7 open the line to the reader contacts Nos. 1–5. During the transmission of the parity check character relay D stays operated through a locking circuit including negative battery conductor 111, make contacts D–5, make contacts A–8 and positive battery conductor 112. Also, the distributor clutch 36 remains energized to transmit the check character over a circuit including negative conductor 111, make contact C–2, now closed, break contact B–3, now closed, and positive conductor 112.

Those of the registers in the stable "1" state have their respective S and T relays energized and the respective make contacts S1–12 are closed to S5–12 while those of the register in the stable 0 state have their respective S and T relays de-energized and the respective make contacts S1–12 are open to S5–12. When the distributor 11 serially examines each of the input leads 40–44, those of the registers having their make contacts S–12 closed apply a marking pulse to the line from the positive side of the line, the respective make contacts S1–12 to S5–12, now closed, the respective make contacts D–2 to D–7, now closed, the respective input leads 40–44 and distributor 11 to the negative side of the line. Conversely, those registers having their make contacts S–12 open have broken the respective paths from positive side of the line to the negative side of the line, resulting in a no current or spacing pulse. In this manner, the resultant odd-even summations of each of the partity registers or counters 20–24 are transmitted and they collectively constitute a code combination or character commonly referred to as a parity check character.

To guard against the clipping of the fifth pulse at the end of the check character distribution there is provided in the circuit of clock pulse relay A, an alternative operating circuit having a timing contact 47 operable by a cam on the distributor cam shaft that is held closed for a longer period of time than the distributor controlled timing contact 48 that normally completes the operating circuit of clock pulse relay A. It will be remembered that distributor timing contact 48 is used during the operation of the parity counters 20–24 to complete the circuit of the relay A and that distributor timing contact 48 opens the circuit of relay A early enough to avoid the counting of transition pulses during the transition of the reader contacts Nos. 1–5. Therefore, to assure the check character is transmitted without clipping, this alternative operating circuit for relay A is provided. This alternative operating circuit for the relay A includes the auxiliary timing make contact 47, break contact C–6 of the C relay and the make contact D–1 of the D relay to form a completed path from conductor 111 through the A relay to the positive conductor 112.

When the odd-even summation in the parity registers 20–24 has been transmitted as a check character, the parity registers 20–24 must be reset before commencing the counting of a new character block. The operation of relay D and the release of relay C condition the reset circuit by opening the break contact D-10 in lead 111 and by opening the make contact C-12 in lead 52, respectively. When the check character has been distributed, relay A is deenergized by the opening of the contact 47 and opens the energizing path over conductor 111 and conductor 53 to all S and T relays by opening its make contact A-12 to restore the parity counters 20–24 to the 0 state preparatory to counting the next block of characters.

To prevent premature zeroing or restoration of the parity counters 20–24 to the 0 state by the relay D before the check character is transmitted, continued operation of either the C or A relay holds closed make contacts A–12 or C–12 to complete a circuit over either leads 52 or 53 to shunt the break contact D10 in the restoring circuit. Also, the S relays of the parity counters 20–24 each have No. 8 contacts in the locking circuit of the D relay to provide a locking circuit for the D relay for so long as any S relay remains energized. Therefore, the D relay cannot be released until all of the counters must have been restored to the 0 state.

The resumption of the feeding and sensing of characters by the tape reader transmitter 10 is initiated at the beginning of the check character distribution cycle by the opening of break contact A–9 to interrupt the holding circuit of relay C. Since the D relay has been previously operated, its break contact D–8 in the alternate holding path for relay C is already open; therefore, opening of break contact A–9 breaks the locking path for relay C and releases the C relay. Upon the release of relay C, its break contact C–1 completes the energization path of the reader clutch trip magnet 33 and the reader 10 begins the sensing of the letters character at the time that the check character is being transmitted. Therefore, because of the one character delay between sensing and transmitting, the letters character will be distributed shortly after the check character. As the distributor finishes transmitting the check character, it will stop and be resynchronized with the tape reader 11 when the tape reader shaft closes contact 37 to operate the distributor clutch magnet 36. Normal operation will continue until the next block boundary characters carriage return, line feed, and letters are detected.

FIGS. 4 and 5 are detached schematic drawings of the error detection equipment at the receiving station wherein there are a plurality of parity counters 60–64 similar to the parity counters 20–24 at the transmitting station for making an odd-even summation of the marking pulses in each level of the characters as they are being received. A probe of the reading contacts Nos. 1–5 at the receiving station it not necessary because the reading contacts all open between characters, whereas at the transmitting station those contacts sensing successive marks remain closed.

At the receiving station the carriage return recognition circuit for the relay B extends through a maze of contacts of the S and T relays arranged in exactly the same manner as the carriage return recognition circuit at the transmitting station. A make contact A–6 of the clock pulse relay A is provided in series with the carriage return recognition circuit to open the circuit and thereby prevent operation of the relay B upon the false closure of the recognition circuit due to transitions after the marking clock pulse ends. Clock pulse relay A functions similarly to the clock pulse relay A at the transmitting station and is energized once in each character receiving cycle upon the closure of a universal contact 100 by a cam (not shown) on the function cam shaft of the typing reperforator to operate timing contacts A–1 and A–5 to A–12 once for every character. Relay B stores the recognition of the carriage return signal until receipt of the next character, line feed, by locking itself up through a locking circuit consisting of lead 65, make contact B–1, the break contact A–6 of the A relay and break contact E–5 of an error relay E. The line feed character is the next character to be received and the fact that relay B has recognized a carriage return character prior to this line feed character is stored by the energizing of relay C prior to receipt of the line feed character and locking up relay C during the receipt of the line feed character by the following:

Relay C is operated through a circuit extending over negative battery conductor 121, break contact D–6, break contact E–8, make contact B–3, lead 66, break contact A–1 to positive battery and relay C is locked up through a circuit extending from conductor 121, make contacts C–5, B–3 and C–1 to positive battery. Relay C stores this recognition of the carriage return character during the receipt of the line feed character.

After the line feed character has been received a relay D is energized, which relay functions to switch the parity counter relays S1 and T1 from a counting function to a comparing function and to stop the feeding of the tape after the punching of the check character in the tape by the reperforator. The operating circuit for relay D extends from negative battery conductor 121, through a manual on-off switch 96, break contact A–5, break contact B–2 make contact C–2 and coil of relay D to positive battery conductor 122. Relay D stays operated during transmission of a check character by locking up through its make contact D–2 and the make contact A–5.

The operation of relay D switches the marking pulse inputs of the code contacts Nos. 1–5 from supplying the inputs to the parity counters 60–64 to the supplying of inputs to five comparison circuits by opening the break contacts D–1, D–9, D–10, D–11 and D–12 and closing the matched make contacts. These comparison circuits function to test the incoming check character pulses generated at the transmitting station with states of counters 60–64 at the receiving staion. The incoming check character pulses are impressed on code contacts Nos. 1–5 and are compared with the states of the counters 60–64, respectively, which states are indicated by the positions of the S1–4 to S5–4 contacts. The make code contacts are closed and the break code contacts are open when a marking pulse is being monitored in that level. When a space pulse is being monitored in that level, the make code contacts are open and the break code contacts are closed. These code contacts can be operated directly from the punches of the reperforator or by relays which monitor the magnetic pulsers of the punches.

For example, a comparison of the parity of the pulse being received over the No. 1 code contacts of the parity counter 60 and parity represented by the operation of the associated S1 relay is accomplished thusly: If a marking condition is impressed at the No. 1 code contacts, the make contacts No. 1 will close and prepare a path from negative battery conductor 121 through make contact No. 1 and the make contact D–1 now closed of the D relay over the conductor 70 to break contact S1–4, now open. Break contact S1–4 is open because the parity counter 60 is a marking or 1 state with the S1 and T1 relays both energized. Hence, the path over lead 70 to the error indicating relay E is opened and the error indicating relay E is not energized.

If a spacing condition is present at code contact No. 1 and the S1 and T1 relays are de-energized indicating a 0 or spacing count, the energizing path for relay E extending from negative battery conductor 121 and through break contact No. 1, now closed, and over lead 71, is opened at make contact S–4 which is now open as register 60 is the spacing or 0 state with both S1 and T1 relays de-energized. Consequently, a concurrence of two spacing signals does not provide a completed circuit to energize the error indicating relay E.

However, if a marking condition is present at the code reading contacts No. 1 and a spacing condition is present in the parity counter 60, a completed circuit from the No. 1 code reading make contact through the D–1 make contact, lead 70 and the break contact S1–4 of the relay S1 to the error indicating relay E is established. This circuit extends from negative battery through closed switch 96, conductor 121, now closed No. 1 code reading make contact, closed make contact D–1, lead 70, closed break contact S1–4, lead 72, closed make contact D–4, closed make contact A–8, closed break contact B–8 and coil of relay E to the positive battery conductor 122. Also, if a spacing condition were present at the No. 1 code reading contacts and a marking condition were present in the parity counter 60, a circuit over the break contacts of the code contacts No. 1 and lead 71 through the now closed make contact S1–4 to the lead 72 would provide a similar path for the energization of relay E to indicate the presence of an error. Manifestly, the other comparison circuits have make and break contacts associated with their respective S relays and code contacts operating in a similar manner to complete a circuit to the error relay E over lead 72 whenever there is a lack of agreement between the condition present at the code reading contact for that level and the parity counter for that level.

Negative battery from conductor 121 is normally furnished to the locking paths for the parity counters 60–64 over break contact D–5. However, during the check comparison cycle break contact D–5 is open and negative battery is supplied over make contact A–4, now closed. Inasmuch as the shunting paths for negative battery through break contact D–5 and make contact C–4 are now open, termination of the clock pulse by the release of relay A opens make contact A–4 and opens the locking circuits for all of the S and T relays. Accordingly, all the S and T relays de-energize and assume a 0 or spacing state. The registers 60–64 are thus zeroed. To assure that relay D does not release and connect negative battery over its break contact D–5 before the make contact A–4 opens the circuits of the registers 60–64, alternative locking paths for the relay D have been provided and each alternative locking path includes a make contact of one of the registers, namely, make contacts S1–3, S2–3, S3–3, S4–3 and S5–3. To preclude the release of relay D and thus sustain the zeroing operation until the make code contacts Nos. 1–5 have assumed their normally open positions, a holding circuit for relay D is maintained from positive source of potential, coil of relay D, make contact D–2, now closed, the lead 74 through any of leads 75–79; the break contacts A–12, A–11, A–10, A–9 and A–7 of relay A; make contacts D–1, D–9, D–10, D–11 and D–12 of relay D; and the code reading contacts Nos. 1–5 to negative battery conductor 121.

In order that the perforated tape at the receiving station be an exact duplicate of the perforated tape at the receiving station be an exact duplicate of the perforated tape at the transmitting station, it is necessary to delete the check character punched in the tape at the receiving station upon receipt of the check character by the reperforator 13. This is accomplished by inhibiting the tape feed after the punching of the check character and then overpunching the check character with the letters character which punches a hole in each level of the tape, thereby effectively deleting the check character. A tape suppression magnet 81 for disabling the tape feeding is energized upon the establishing of a circuit from positive battery, through the coil of the magnet 81, through break contacts C–3 and make contacts D–6 to negative battery. The tape suppression magnet 81 disables the tape feed for a one character cycle by pulling a tape feed pawl (not shown) clear of the tape driving means (not shown).

Upon the detection of an error, three optional modes of operation for indicating an error can be utilized in the preferred embodiment of the invention. In all modes of operation a lamp 85 is lighted and a bell 84 is rung at the receiving station (FIG. 4) to indicate an error. The first mode of indicating an error is the mark only option in which an errored block is designated in the perforated tape by punching a sixth level perforation next to the letters character which follows the block containing the error. The marking of the tape is accomplished by energization of an edge notch magnet 83 and the operation of its punch pin upon the closing of make contact E–11 of the E relay, which is operated whenever an error is detected. The E relay in this option stays operated from the time of the check character comparison until the time the letters character function cycle begins because it is locked up through the break contact A–8 of the A relay and make contact E–10 of the E relay. Also, the edge notch magnet 83 is held in an operated condition until the reperforator 13 functions to perforate the letters character, at which time, clock pulse relay A opens its break contact A–8 to release relay E. Thus, the edge mark is produced in alignment with the letters character following the block having an error therein. The opening of make contact E–11 releases the edge notch magnet 83 so that only one character, letters, has an error notch in its sixth level.

Another optional mode for indicating an error is a short break shutdown operation with edge notch. As its name indicates, the reperforator at the receiver edge notches the perforated tape next to the letters character in a manner similar to that in the mark only mode, but additionally, shuts down for a short period and notifies the transmitting station that an error has been detected. In addition to closing its make contact E–11 to complete the circuit for the bell 84, lamp 85 and edge notch magnet 83, relay E causes energization of relay B by closing its make contact E–5 which in cooperation with the already closed make contact D–3 of the D relay and break contact A–6 of relay A furnishes an energizing path for the B relay. Relay B serves as a slow release timing relay with a holding circuit through a resistance capacitance circuit in which the current gradually decays until it falls below the release current of the relay B. This holding circuit for relay B extends over lead 86 through make contact E–2, resistor 87, capacitor 88 and conductor 97 to negative battery. Normally closed break contact E–2 is provided to discharge the capacitor 88 between the detection of errors. A potentiometer 89 is included in parallel to this resistance capacitance circuit to add a very small constant holding current through make contact E–6 of the E relay for the dual purpose of providing an adjustment for the release time of the relay B and reducing the size of the capacitor 88 necessary to keep relay B operated for the required time. When relays E and B are both operated, the line is held open by the now open break contacts E–7 and B–7 of the E and B relays, respectively, to indicate to the transmitting station that an error has occurred. The line will be held open by break contact B–7 as long as the relay B is operated inasmuch as relay B is a timing relay for relay E.

The selector magnet at the receiving station, designated 90 in FIG. 4, normally responds to the condition of a make contact G–1 to control the operation of the perforator in the receiving station. The operation of line relay G closes contact G–1 in response to mark signals on line 57 and opens contact G–1 in response to space signals on the line.

To prevent the response of the selector magnet 90 of the reperforator to the opening of the line by break contacts B–7 and E–7, make contacts D–8 and E–4, now closed, are provided to shunt the make contact G–1 and maintain battery across the selector magnet 90 to keep it operated as though a stop pulse were continually being applied to the line. The duration of the line break to notify the operator at the transmitting station of an error in the previously transmitted line of information is of relatively short duration because the time for releasing relay B through the above slow release holding circuit is of a relatively short duration. Upon the release of relay B, break contact B–7 closes and the line 57 is restored with relay G becoming energized. Relay G closes its make contact G–1 and completes an alternative operating circuit for selector magnet 90 while make contact D–8 is being opened by the release of relay D. Relay D is released due to opening of make contact B–10 in the holding circuit of relay D, which holding path was from positive battery, coil of relay D, break contact D–2, lead 120 and make contact B–10 to negative battery on line 121.

To prevent a feeding operation between the edge notch perforation, which indicates the error, and the immediately following letters character, a feed suppression magnet 81 is provided to disable the tape feeding means during the error detection and shutdown periods. The energizing circuit for the feed suppression magnet 81 includes negative battery conductor 121, make contact D–6, now closed, break contact C–3, coil of feed suppression magnet 81, a manually operable switch 98, now closed, and the positive battery conductor. Therefore, when the relay D opens its make contact D–6, the feed suppression magnet 81 releases and the tape feed mechanism becomes operative to feed the tape forward for each following character.

The third mode of indicating the occurrence of an error is a long break shutdown with manual error deletion. The long break shutdown is similar to the short break shutdown in that the line 57 is broken to indicate to the transmitting station that an error has occurred. The circuitry for the long break shutdown is similar to the circuitry for the short break shutdown in that relay B is operated due to the closing of make contact E–6 when relay E is energized upon detection of an error, but differs from the circuitry of the short break shutdown in that the holding circuit for relay B does not go through the resistor 87 and capacitor 88 but instead has a shunt path over a shunt strap 99, shown in dotted lines, and through a manually operated push button switch 91, now closed. The shunt strap 99 is, of course, provided only if a long break operation is wanted. Relay B will stay operated over this locking path until the receiving operator opens the manually operable switch 91. In a long break shutdown applique, relay B and relay E are energized so long as manual switch 91 is closed and hence their break contacts B–7 and E–7 hold open the signal line 57 until this switch 91 is opened. It is contemplated that the long break shutdown will enable the receiving station operator to perform an obliterating action on the message containing the error after manually turning the feed wheel to backspace the tape. The operator can manually turn the feed wheel to back space since feed suppression magnet 81 is energized and the feed mechanism is disabled. The operator may then step the tape forward and at each character position in the line overpunch the characters in the line with the letters character which perforates all five levels and hence deletes each character. After obliterating the line containing an error, the operator will depress a push button that opens manual switch 91 in the locking path of relay B. Release of relay B permits break contact B–7 to close the line 57 to signal the transmitting station that the receiving station is prepared for reception of the retransmitted line.

Returning now to FIGS. 2 and 3, the operation of the transmitting station upon detection of an error at the receiving station will be examined. As previously stated, the line break is utilized to notify the transmitting station that an error has been detected. A line following relay F (FIG. 3) is connected in series with the signal line and each time relay F is energized it closes its make contact F–1 (FIG. 2) to supply current to operate a slow release line break recognition relay E (FIG. 2) through either of two paths as is more fully explained hereinafter. The line break de-energizes relay F and its make contact F–1 opens the energizing circuit of slow release relay E, which initiates storage of the recognition of the line break by releasing after a predetermined length of time. Once relay E has released, subsequent operations of relay F will not cause the relay to be energized since make contacts E–6 and G–6 in both energizing paths for relay E are open. Only re-operation of the relay G by manual operation of re-start switch 92—to be described in detail infra—establishes a new connection. Thus, the operator has control over the length of shutdown time in which to determine the cause of the error and pull back the tape prior to retransmitting the line of characters in which an error has occurred.

To re-start transmission, the operator need only depress a re-start switch 92 which completes an obvious circuit for relay G. Relay G locks up over negative battery conductor 111, break contact E–3, now closed, make contact G–4, now closed, and negative battery conductor. Relay G functions as a re-start relay in that its make contact G–6 conditions an energizing path for relay E from negative battery, make contact G–6, now closed, make contact F–1, now open, coil of relay E to positive battery conductor. Accordingly, relay E will be energized when make contact F–1 subsequently is closed due to the operation of line following relay F by a marking pulse sent over the line by the receiving station operator. Thus, it will be apparent that the operator at the transmitting station need not hold the reset push button 92 continually depressed to insure that relay E will operate when the operator at the receiving station signals to go ahead with the retransmission of the error containing block.

To avoid requiring the operator to depress the re-start switch 92 when the error control accessories are first turned on by the operator moving the start switch 93 from "off" contact 94 to "on" contact 95, the E relay has an energizing path through start switch 93 and "off" contact 94, break contact G–6, now closed, make contact F–1, now closed, coil of relay E to positive conductor. Relay E is locked up from negative battery conductor, make contact E–6, now closed, break contact G–6, now closed, make contact F–1, now closed, and coil of relay to positive battery conductor. Thus, it will be seen that relay E is energized even though the error control accessories are turned off and that, upon the turning on of the error control accessories, the re-start switch 92 need not be operated to energize relay E.

When the transmitter distributor is shutdown by a line break, the parity counters 20–24 must be reset to zero before starting the parity checking of the next line and this is accomplished by having a make contact E–7 located in the negative battery conductor 111 to the parity counters 20–24. The make contact E–7 opens the circuit from negative battery to the parity counters 20–24. Those of the parity counters that were previously energized in the 1 or marking state release and assume the 0 or spacing state. Closure of re-start switch 92 again causes relay E to energize and make contact E–7 to again apply negative battery to the registers 20–24.

Although only one embodiment of the invention is shown in the drawings and described in the foregoing specification it will be understood that invention is not limited to the specific embodiment described but is capable of modification and re-arrangement and substitution of parts and elements without departing from the spirit of the invention.

What is claimed is:

1. In a system for detecting errors in the transmission of a block of telegraphically transmitted characters wherein the characters are transmitted as permutatively arranged pulses of two conditions in a plurality of levels, binary counters individual to each level for performing and odd-even summation of one condition at each level by shifting from one to another of two stable counting states in response to pulses of that one condition, a first set and a second set of transfer contacts actuated by said counters, and an end-of-block character recognition circuit for interrupting transmission of characters completed through said contacts when at least one of said counters is in one stable state and at least another one of said counters is in a state of transition during the shift to the second stable state caused by receipt of the end-of-block character.

2. An error detection system wherein a parity check is made of the pulses of one condition in each level of a block of characters, means in each level for indicating the presence of pulses of either of two conditions, a pair of relays in each level energizable into two transitory shift states upon the presence of a pulse of the one condition and assuming energized or de-energized conditions constituting two stable states to indicate an odd or even number of pulses of the one condition in each level, and an end-of-block character recognition circuit for causing a read-out of the odd or even states of the binary counters and having two sets of contacts for completing the circuit, a first of said sets being actuated by those relays not shifting during receipt of an end-of-block character and a second of said sets being actuated by those relays shifting during receipt of the end-of-block character.

3. A system for monitoring errors in a code message in which each message character is composed of a unique plurality of signal elements of two conditions on a plurality of levels comprising a monitoring means providing elements in each level which correspond to the signal elements and which together permutatively represent a character, binary registers operable by the monitor means for counting the elements of one condition in each level and each having first and second relays constituting a flip-flop, a circuit connecting said relays for energizing only one of the relays during the presence of an element of the one condition and placing both of said relays in the same energized or de-energized state upon termination of the element of the one condition, and an end-of-line recognition circuit completed by closing a path through a first set of contacts associated with said first and second relays of the registers receiving an element of the one condition during the end-of-line character and through second contacts associated with said first and second relays of the registers receiving an element of the other condition during an end-of-line character for completing the end-of-line recognition circuit during the presence of an element of the one condition.

4. An error detection system for a block of characters comprising a transmitting means for transmitting marking and spacing bits defining the characters of said block, binary devices monitoring the transmitting means for each bit of a character for counting the marking bits in a block of characters by shifting from a first stable count state through a transition state to a second stable count state, an end-of-block character recognition circuit for disabling said transmitting means and instituting transmission of the binary counts as a check character, said end-of-block character recognition circuit having for completion thereof a first set of contacts operated by those binary devices remaining in the first stable state during receipt of an end-of-block character and a second set of contacts operated by the binary devices in the transition state and shifting to the second stable state during the duration of the end-of-block character, means for receiving said transmitted marking and spacing bits of the check character, binary devices monitoring the bits constituting the characters received by the receiving means for counting the marking bits in a block of characters by shifting from a first stable count state through a transition state to a second stable count state, an end-of-block character recognition circuit for disabling said receiving means and instituting a check comparison cycle, said end-of-block character recognition circuit having for completion thereof a first set of contacts operated by those binary counters remaining in a stable state during the receipt of an end-of-block character and a second set of contacts operated by the binary counters in the transition state and shifting to the second stable state during the duration of the end-of-block character, and a comparison means at the receiving station for comparing the check character generated by said binary counters monitoring the transmitting means with the check character generated by said binary counters monitoring the receiving means.

5. The system according to claim 4 wherein said receiving means is a tape reperforator which includes a tape feeding means for feeding the tape being perforated by said tape reperforator, and a means for disabling said tape feeding means during the punching of the check character whereby a subsequent character recorded in the tape may be superimposed over the check character to delete the check character from the tape.

6. The system according to claim 4 including means responsive to operation of said comparison means for indicating disagreement between check characters.

7. In an error detection system wherein an odd-even count is made of the pulses of one of two conditions of a line of telegraphic signals bounded by signals representative of carriage return, line feed and letters and wherein the odd-even count is transmitted as a parity check signal between the line feed and letters signals, the improvement comprising means for recording the received telegraph signals in a recording medium, binary registers for performing an odd-even count of the pulses of said one condition recorded by said recording means, feeding means normally feeding the recording medium for each of the signals received, and means for temporarily disabling said feeding means and stopping the feeding of the recording medium during the receipt of the parity check signal and the following letters character whereby said parity check signal is effectively deleted by the superimposed letters character.

8. A character recognition circuit for recognizing a permutative combination of marking pulses and spacing pulses received in a plurality of levels comprising a W–Z frequency divider in each level of the character, a first path having in series a first set of contacts operated by said W–Z frequency dividers in those levels receiving a spacing pulse, and a second path in series with said first path to complete the character recognition circuit and having a second set of contacts operated by its W–Z frequency divider during the duration of the marking pulse to complete said first and second paths.

9. A character recognition circuit for recognizing the permutative combinations of marking and spacing pulses constituting the character comprising a plurality of binary counters for performing an odd-even summation of the marking pulses by shifting back and forth from a first stable count state to a second stable count state, a first set of contacts operated by the binary counters which remain in said first stable state during receipt of the character, and a second set of contacts operated by said binary counters which shift state to said second stable state to cooperate with the first set of contacts to complete said circuit.

10. A character recognition circuit for recognizing a permutative character code of marking and spacing pulses in a plurality of levels comprising, a first relay for each level of the character code, a second relay for each level of the character code, circuit means interconnecting said relays in the same level for energizing said first relay during the duration of a first marking pulse and said second relay at the termination of said first marking pulse and for de-energizing said first relay during the duration of a second marking pulse and for de-energizing said second relay at the termination of the second marking pulse, a first set of contacts operated by said first and second relays in those levels receiving a spacing pulse during receipt of the character being recognized, and a second set of contacts operated by said first relays during the duration of a marking pulse in those levels receiving a marking pulse and connected in series with said first set of contacts to complete the character recognition circuit.

11. A character recognition circuit for determining when a particular permutative combination of marking and spacing pulses being sent over a fixed number of levels is present comprising a pair of first and second relays in each level, only said first relay being energized during the duration of a first marking pulse and only said second relay being energized during the duration of a second marking pulse thereby defining two unique transitory shift states, at the termination of a marking pulse said pair of relays both being energized or de-energized to define two unique stable states, a first path having a first set of contacts therein and prepared by said pairs of relays remaining in a stable state during the recognition of the particular character and a second path, in series with said first path to complete said circuit, having a second set of contacts therein prepared by those pairs of relays in said unique transitory shift states during the reception of the recognizable character.

12. A recognition circuit for marking and spacing pulses permutatively arranged in a plurality of levels to form an end-of-line character comprising first and second relays in each level for binarily counting the marking pulses received in each level, said first relay being energized on the receipt of a first marking pulse and de-energized upon the receipt of a second marking pulse, said second relay following said first relay upon the termination of each marking pulse, a first set of contacts preparing the recognition circuit and operated by said first and second relays associated with those levels of the end-of-line character which have spacing pulses, and a second set of contacts operated by said first relay during the duration of a marking pulse only in those levels having a marking pulse during the end-of-line character for completing the recognition circuit.

13. A character recognition circuit for completing a path during the occurrence of its permutative combination of marking and spacing signals occurring in a plurality of levels comprising: a bistable device for each level of the character code and having a pair of relays energized together in a first stable state after the receipt of a first marking pulse and de-energized together after the receipt of a second marking pulse, one of the relays of said pair being energized during the duration of the first marking pulse and de-energized during the duration of a second marking pulse, the second of the relays of said pair of relays being energized upon the termination of a first marking pulse and de-energized upon termination of a second marking pulse; a first path prepared by the first and second relays in those levels receiving a spacing pulse during the receipt of the character to be recognized and having two parallel branches, the first branch having a make contact associated with said first relay in series with a make contact associated with the second relay in each level receiving a spacing pulse during the character to be recognized, and the second parallel branch having a break contact associated with said first relay in series with a break contact associated with said second relay; and a second path in series with said first path to complete the character recognition circuit and prepared by the first and second relays in those levels receiving a marking pulse during the receipt of the recognized character, said second path having two parallel branches, the first branch having a make contact associated with the first relay in series with a break contact associated with said second relay and the second parallel branch having a break contact associated with said first relay in series with a make contact associated with said second relay.

References Cited in the file of this patent

UNITED STATES PATENTS

| | | |
|---|---|---|
| 2,767,910 | Vande Sande | Oct. 23, 1956 |
| 3,008,004 | Young | Nov. 7, 1961 |

UNITED STATES PATENT OFFICE

CERTIFICATE OF CORRECTION

Patent No. 3,147,460 September 1, 1964

Richard D. Scott

It is hereby certified that error appears in the above numbered patent requiring correction and that the said Letters Patent should read as corrected below.

Column 2, line 34, for "drawing" read -- drawings --; column 5, line 3, for "ulse" read -- pulse --; column 7, line 51, for "partity" read -- parity --; line 70, for "S1-12 are closed to S5-12" read -- S1-12 to S5-12 are closed --; line 73, for "S1-12 are open to S5-12" read -- S1-12 to S5-12 are open --; column 8, line 57, after "long" insert -- a time --; column 9, line 73, for "staion" read -- station --; column 10, line 29, for "S-4" read -- S1-4 --; column 11, lines 14 and 15, strike out "receiving station be an exact duplicate of the perforated tape at the"; column 14, lines 67 and 68, for "terminatoon" read -- termination --.

Signed and sealed this 19th day of October 1965.

(SEAL)
Attest:

ERNEST W. SWIDER
Attesting Officer

EDWARD J. BRENNER
Commissioner of Patents